United States Patent [19]

Russo et al.

[11] 4,092,301

[45] May 30, 1978

[54] ANIONIC POLYMERIZATION OF LACTAM WITH CATALYST, ACTIVATOR AND LITHIUM HALIDE

[75] Inventors: Saverio Russo; Estella Bianchi; Alberto Ciferri; Barbara Valenti; Giorgio Bontá, all of Genoa, Italy

[73] Assignee: Consiglio Nazionale Delle Richerche, Rome, Italy

[21] Appl. No.: 653,893

[22] Filed: Jan. 30, 1976

[30] Foreign Application Priority Data

Feb. 13, 1975 Italy .................................. 12460 A/75

[51] Int. Cl.$^2$ ............................................. C08G 69/18
[52] U.S. Cl. ............................. 260/78 L; 260/37 N; 260/78 P
[58] Field of Search ............................. 260/78 L, 78 P

[56] References Cited

U.S. PATENT DOCUMENTS

| | | | |
|---|---|---|---|
| 3,405,099 | 10/1968 | Taber | 260/78 P |
| 3,451,963 | 6/1969 | Tierney et al. | 260/78 L |
| 3,591,565 | 7/1971 | Hansen | 260/78 S |

*Primary Examiner*—Harold D. Anderson
*Attorney, Agent, or Firm*—Young & Thompson

[57] ABSTRACT

A process by which transformations of linear polyamides are performed at temperatures below the melting and decomposition temperatures of pure polyamides, wherein anionic polymerization of dry lactams with 4 to 12 carbon atoms is performed in the presence of one or more lithium halides, in amounts ranging from 1 to 10% in weight of the polymer.

4 Claims, No Drawings

ANIONIC POLYMERIZATION OF LACTAM WITH CATALYST, ACTIVATOR AND LITHIUM HALIDE

This patent concerns a process of polyamide preparation with a melting point lower than that of polyamides obtained by conventional synthetic processes. Consequently, these products are processable at temperatures below those used for conventional, pure polyamides.

It is well known that the processing of synthetic polymers like polyamides, in order to obtain films, fibres, extruded or molded objects, requires the use of temperatures higher than the glass transition and melting transition temperatures of the polymer, with a resulting increase in plasticity and fluidity. Quite often, however, the melting point is so high as to require costly energy inputs or, alternatively, the introduction of a solvent which subsequently must be eliminated from the final product. In addition, some polymers have a melting temperature so high that thermal decomposition takes place at or even before reaching the melting point.

It has been recently already found how it is possible to decrease the melting temperature of polyamides like polycaprolactam and poly (hexamethylenadipamide) by the addition of small amounts of inorganic salts like LiBr, LiCl, etc.

To get this effect it is however necessary to mix salt and polymer very thoroughly; sometimes, this can be achieved only by heating the polyamide above its melting temperature. Consequently, the aforementioned method could not be applied when the polymer melting temperature is higher than the polymer decomposition temperature. Besides, the required energy input would introduce a significant cost into the overall procedure.

The present invention provides to introduce the salt into the polymer (with a resulting melting point depression) avoiding any polymer heating at or near its melting temperature, without the use of any solvent. This, together with other advantages, is achieved in the present invention by a process of anionic polymerization or co-polymerization of lactams in an essentially anhydrous system and in the presence of a small amount of lithium halide, usually less than 10% (in weight) of the monomer. Neither the rate of polymerization nor the molecular weights of the resulting polymer are strongly influenced by the presence of the additive. The catalyst, usually the sodium salt of the lactam, does not show any decrease of activity due to the interaction with the lithium salt. The specific role of the salt is thus entirely different from that described in the U.S. Pat. No. 3,673,161 of Sebenda an Puffr, who have polymerized lactams in the presence of polyvalent cations with the sole scope of permanently reducing the crystallinity without alteration of the melting point. On the contrary, the specific use of a monovalent cation like Li+ produces a lowering of the melting point, thus allowing the polymer to be processed below this temperature. Besides, the melting point depression effect is only temporary, and hot water washing, for instance, can restore the characteristics of the pure polyamide. With the process described in this invention it is possible to produce polyamides with a lithium salt content varying between 1% and 10% and with melting points as low as 100° C below that of the pure polyamide. Among lithium salts, Li chloride has produced strong effects and has the additional advantage of being more economical.

Among the lactams susceptible to polymerization in the presence of the additive, with production of a low-temperature melting polymer, there are ring compounds with 4 to 12 carbon atoms. Particularly interesting is the case of pyrrolidone whose polymer (Nylon 4) in the pure state decomposes at the melting temperature, a fact which strongly reduces its processability.

Another advantage of lactam polymerization in the presence of lithium halide is found when preparing composites with glass beads or glass fibers; in this case the present invention enables to produce perfectly homogeneous samples with optimal adhesion between glass and polymer. It is known that the mixing of glass filler with a preformed polymer does not normally produce a good, homogeneous distribution of the filler.

According to the present invention lactam polymerization is performed with some activators, normally compounds which can react with the lactam with the production of tertiary nitrogen compounds, where N is bonded to two carbonyl groups or to one carbonilic group and an electrophile group. These compounds are activators of the polymerization reactions at sufficiently low temperatures, in all cases below the melting temperature of the pure polyamide.

The high rate at which anionic polymerization takes place constitutes another advantage of the process of this invention especially when comparison is made with the normal process of polymerization by hydrolysis, which requires much longer reaction times. Another advantage can be found in the fact that the presence of a Li halide increases melt viscosity and depresses the rate of crystallization. It is thus possible to improve the processability of polyamides which have, especially when low molecular weights are present, a low melt viscosity which can cause trouble during polyamide processing. Polyamides prepared according to the present invention can in fact exhibit mechanical properties superior to those of conventionally prepared polymers.

The examples which follow are given for a better understanding of the essential aspects of the present invention but do not represent any limitation of it. Said examples show very clearly the possibility of obtaining fibers and films by working at temperatures well below the conventional ones.

EXAMPLE 1

Lithium chloride (LiCl) is added to 250 g of dry ε-caprolactam with a percentage ranging from 1 to 4% (in weight) of the monomer; with some stirring, the mixture is heated to 100°–140° C to insure the complete solubilization of the salt. The mixture is then cooled to 90° C and metallic Na is added, enough to give 0.4–0.6% molar of Na-caprolactam (the catalyst). The temperature is then increased to 100°–170° C and the activator, 0.4–0.6% molar of N-acetyl caprolactam, is added; the polymerization reaction takes place in a few minutes, with yields very near to 100%.

From intrinsic viscosity measurements of the polymer in m-cresol at 25° C and the use of the equation reported in the literature $[\eta] = 320.10^{-5} \cdot M^{0.62}$ it can be seen (Table I) that the molecular weight of polycaprolactam is not particularly affected by the presence of LiCl. Thermodynamic melting temperatures $T_m$, measured by a differential scanning calorimeter, are also shown in Table I.

It is to be noted that the decrease in $T_m$ is not permanent: hot water washing will in fact restore $T_m$ to the standard value of the conventional polymer. Melt viscosity data, measured at 250° C and extrapolated to zero gradient, are indicated in Table I and show a viscosity increase due to LiCl.

In order to know the effect of LiCl on the rate of crystallization, the time taken by a sample to decrease its volume by 10% has been measured at 200° C. This time has changed from 8 to 200 minutes on increasing the LiCl concentration from 0% to 2%, thus-showing a strong effect of LiCl on the rate of crystallization

TABLE I

| % Added Salt (by weight) | Intrinsic Viscosity dl/g | Molecular Weight | Melting Temperature ° C | Melt Viscosity at 250 poises |
|---|---|---|---|---|
| 0% | 1.65 | 23,800 | 240° | $3.6 \cdot 10^3$ |
| 1% | 1.50 | 21,000 | 230° | — |
| 2% | 1.43 | 18,800 | 220° | $3.01 \cdot 10^3$ |
| 3% | 1.30 | 15,500 | 204° | — |
| 4% | 1.55 | 21,400 | 192° | $8.5 \cdot 10^3$ |

EXAMPLE 2

Polycaprolactam with 4% of LiCl in weight, prepared as in Example 1 but with a molecular weight of 14,000 (by suitably adjusting catalyst and activator concentration) has been used to prepare fibers by extrusion of the polymer melt at 195° C through a capillary rheometer. Fibers of one millimeter in diameter can be extruded at a temperature which is 45° C below the melting point of the pure polyamide.

Films of 2 millimeters of thickness were prepared by compression molding at 150 Kg cm$^{-2}$ for 40 seconds at 200° C. LiCl was then washed away with boiling water and the torsional modulus was measured on a Clash-Berg apparatus. The torsional modulus at 10 seconds and at room temperature was $1.6 \cdot 10^4$ Kg cm$^{-2}$. A sample of the same polymer prepared without LiCl required a temperature of 245° C for the compression molding (i.e. 5° C above its melting temperature) and the corresponding modulus was $1.1 \cdot 10^4$ Kg cm$^{-2}$, smaller than that of the polyamide-LiCl sample.

EXAMPLE 3

Polymerization is performed as in Example 1 but with the addition of 20% in weight of glass beads (40–50 μ in diameter). Adeguate stirring results in a homogeneous distribution of the filler into the mass polymerizing at 100°–170° C; the same is true for the final polymer, as shown by microscopy observation. Mechanical properties of these samples were studied by an INSTRON instrument; elongation at break of mixtures with 2% LiCl was decreased by a factor of 3, whereas samples without LiCl had an increase in elongation of a factor of 4, resulting from the addition of glass beads. These results show the role of LiCl in increasing the adherence between polymer and glass.

EXAMPLE 4

LiCl in amounts comprised between 1 and 10% in weight is added to 350–400 g of anhydrous pyrrolidone. After salt solubilization, metallic Na is added to form a 0.2–0.6% molar mixture of Na-pyrrolidone (Catalyst). Dried carbon dioxide is then added (600–700 ml at 40°–60° C) and the polymerization takes place rapidly with a high yield.

Use of the same procedure, but without salt, gives a polymer which melts and decomposes at 265° C. In contrast a sample containing 8% LiCl showed a melting temperature of 187° C, whereas decomposition began at 265° C. Consequently, it was possible to prepare films and fibers of this polymer, as in Example 2, at a temperature of 200° C, i.e. 70° C below the normal temperature of melting and degradation of the pure polyamide.

EXAMPLE 5

LiBr, in amounts between 1 and 4% in weight, is added to 250 g of dry caprillactam and the mixture is. heated until complete solubilization of the salt occurs. After cooling at 90° C, metallic Na is added in amounts such as to give a 0.3–0.7% molar solution of Na-capril lactam. The mixture is then heated at 170° C, the activator (N-acyl lactam) is added and the polymerization is allowed to be completed over a period of a few hours.

Melting temperature, measured by a differential calorimeter, is 200° C for a sample without salt; introduction of 3% LiBr decreases it to 185° C. Even if the depression of the melting temperature decreases on decreasing the number of carbon atoms of the polyamide, it is still possible to lower by some degrees the temperature at which these polymers are transformed (as in Example 2).

As in Example 3, the presence of salt allows homogeneous incorporation of 20% glass beads into capryl lactam polymers.

EXAMPLE 6

LiCl in amounts equal to 1–8% in weight is added to a monomeric mixture of caprolactam and pyrrolidone (with monomer ratios between 1/20 and 20/1). The stirred mixture is heated until complete salt solubilization occurs. After cooling below 100° C, metallic Na is added in amounts such as to give a 0.4–0.6% molar of Na-lactam, which acts as catalyst. After addition of N-acyl lactam as an activator (0.4–0.6% molar), the polymerization is continued at temperatures between 70° and 170° C, with high reaction rates and good yields.

What we claim is:

1. A process for preparing a film and fiber forming polylactam from a lactam having 4–12 carbon atoms in the lactam ring, comprising polymerizing an anhydrous mixture of at least one lactam, an alkaline anionic catalyst, an anionic activator and 1 to 10% by weight based on the weight of the polylactam of at least one lithium halide selected from the group consisting of lithium chloride and lithium bromide.

2. A process according to claim 1, wherein two or more lactams of the $C_4$–$C_{12}$ series are copolymerized.

3. A process according to claim 1, wherein the lithium haldide used is LiCl, in amounts ranging from 1 to 5% in weight.

4. A process according to claim 1, wherein fillers are added to said polyamides.

* * * * *